May 8, 1934.   G. H. HORNE ET AL   1,957,458
APPARATUS FOR ELECTRICAL PRECIPITATION OF SUSPENDED PARTICLES FROM GASES
Original Filed April 11, 1932   8 Sheets-Sheet 4
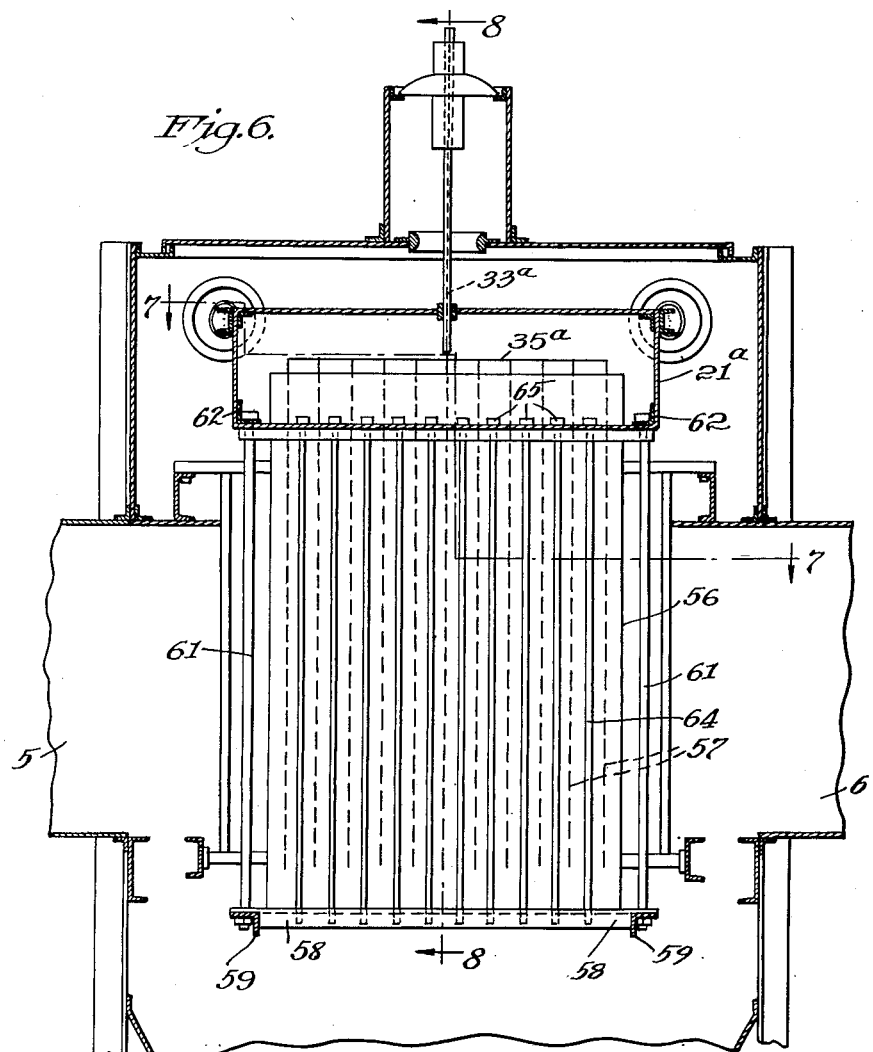
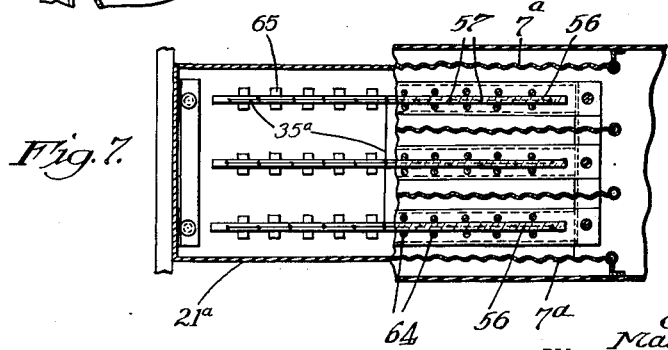
INVENTORS:
George H. Horne,
Marcel A. Lissman
BY
ATTORNEYS.

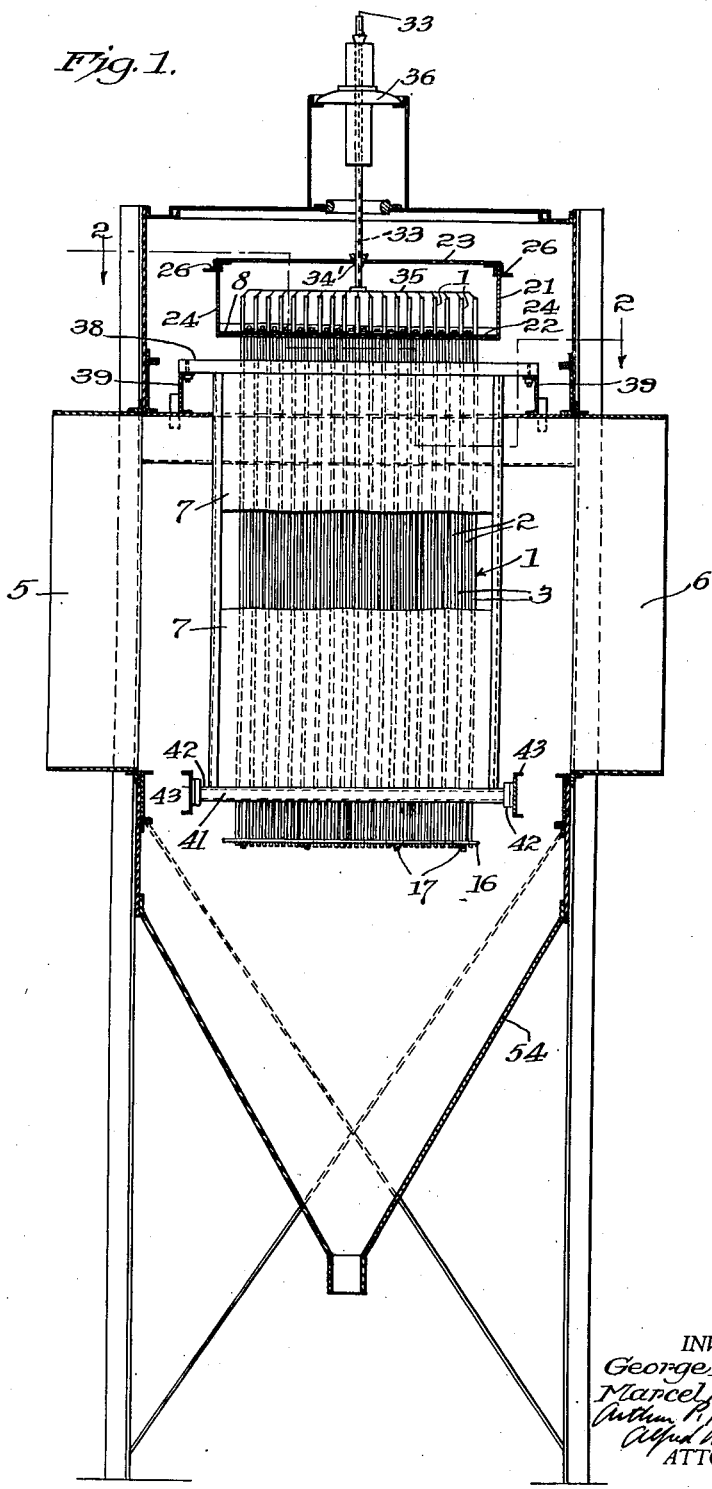

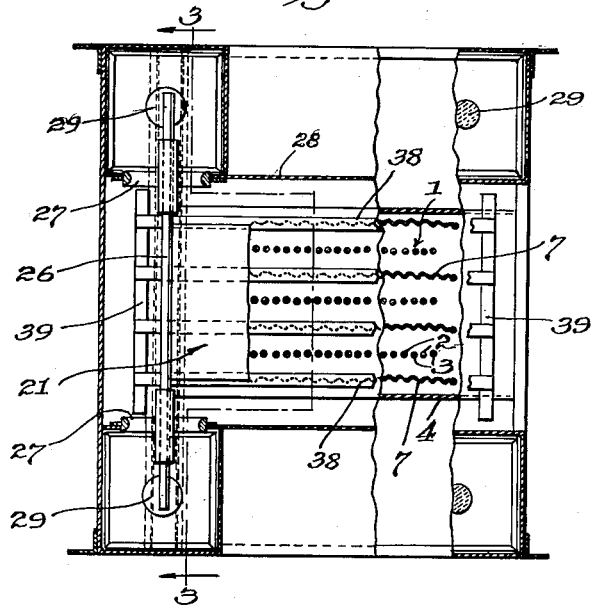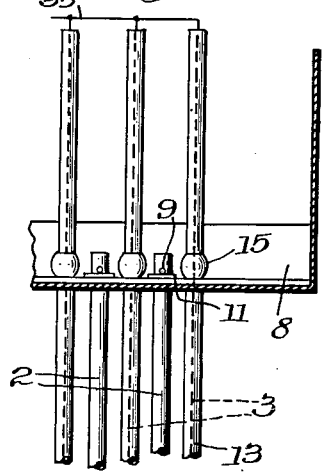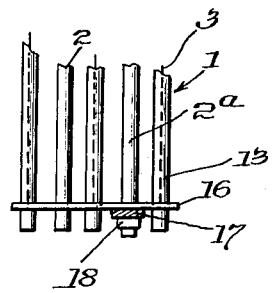

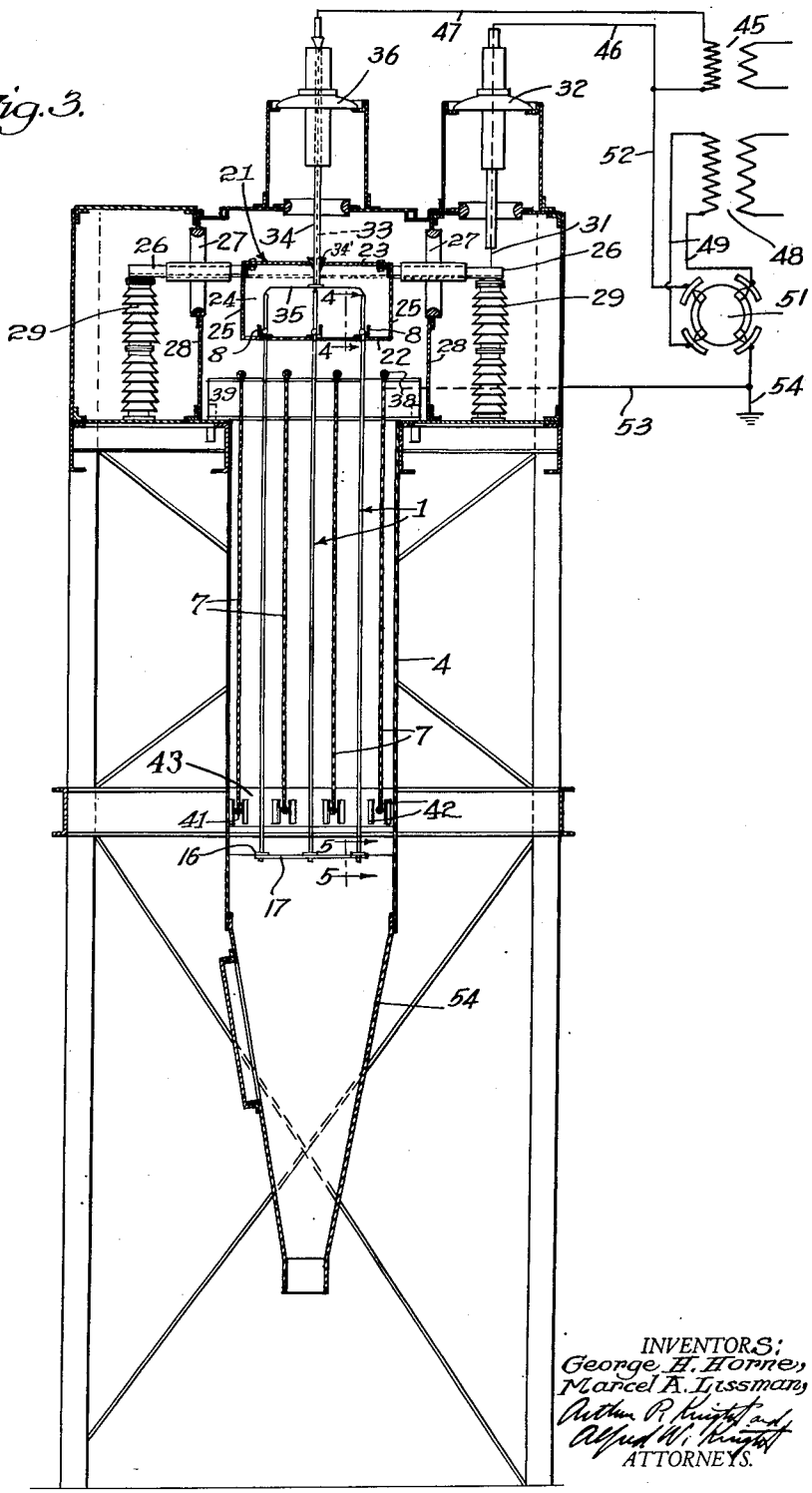

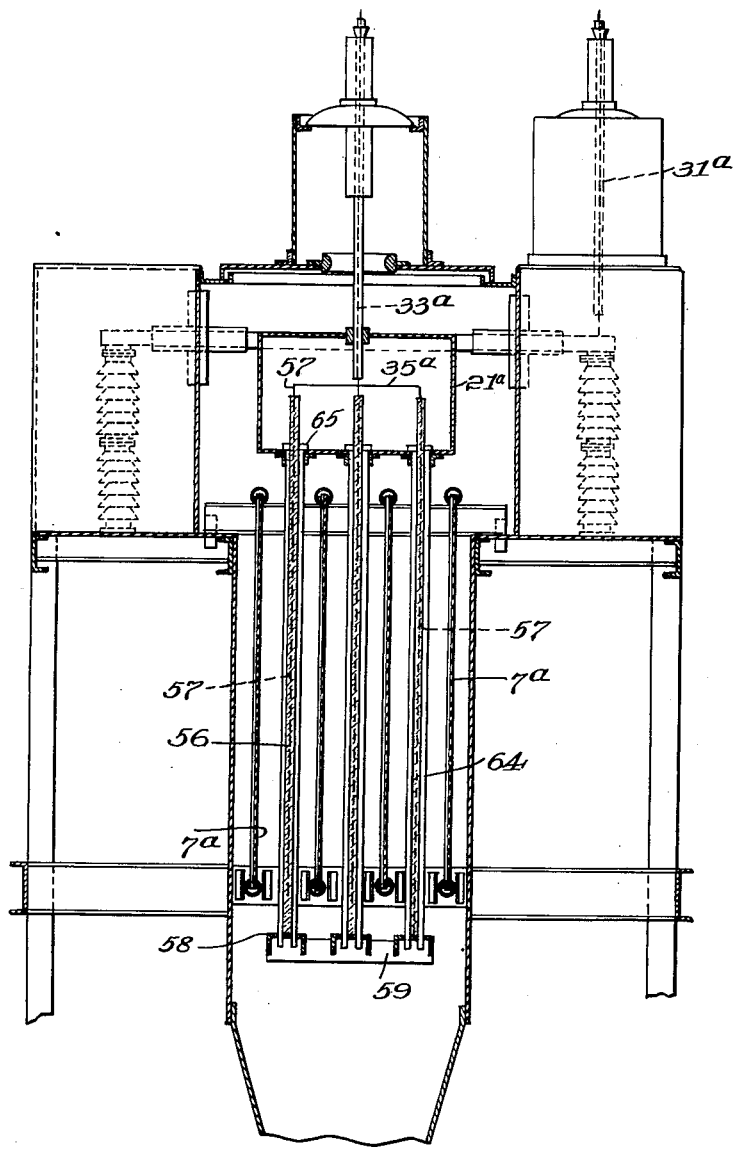

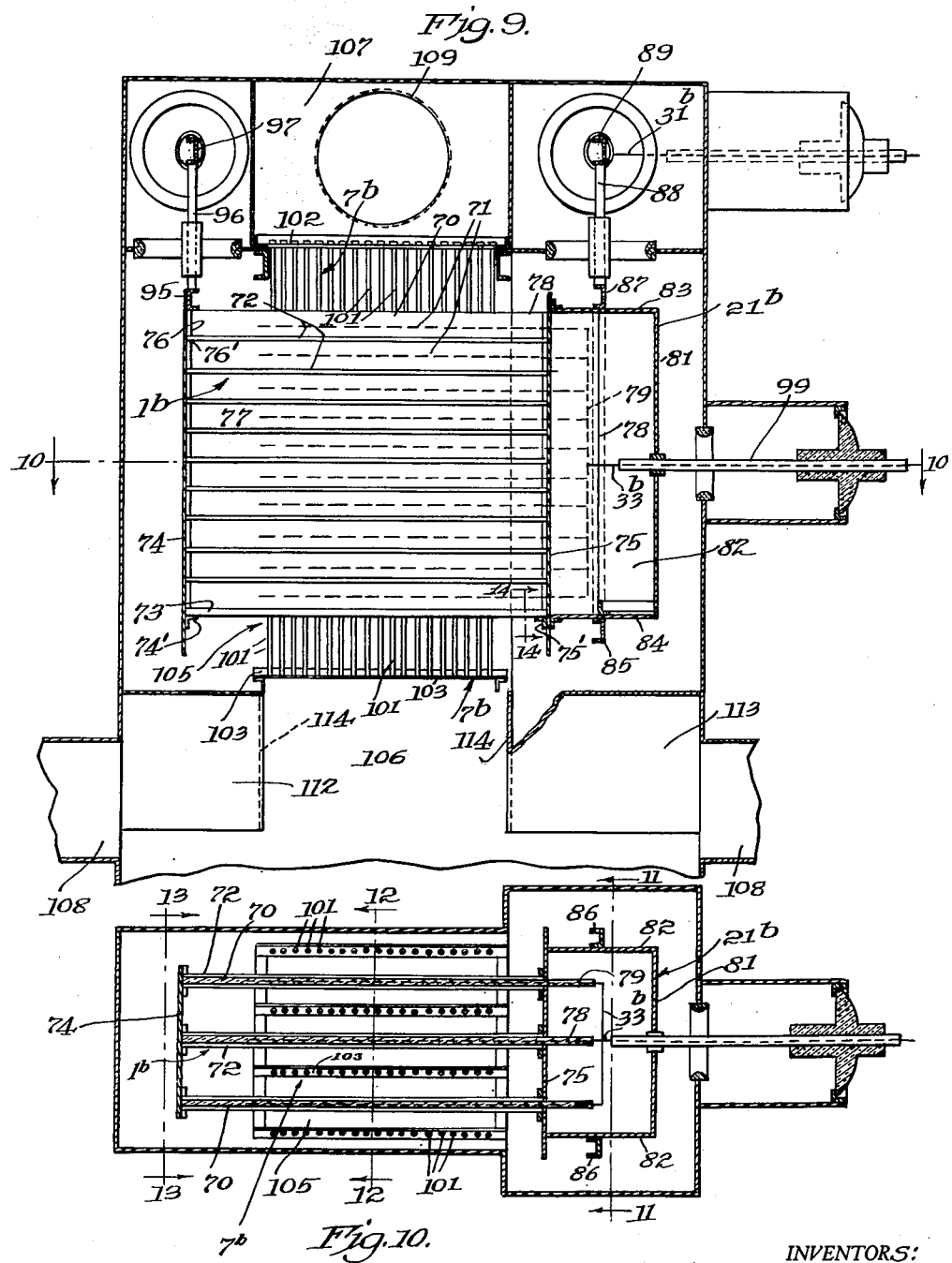

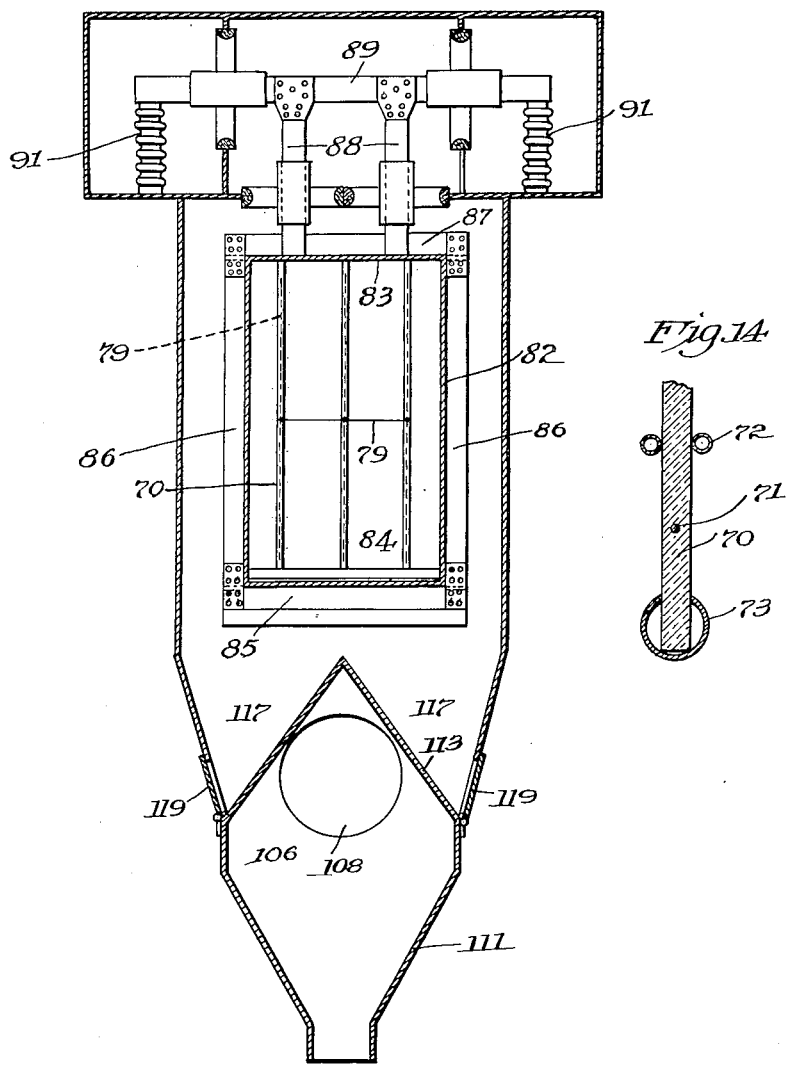

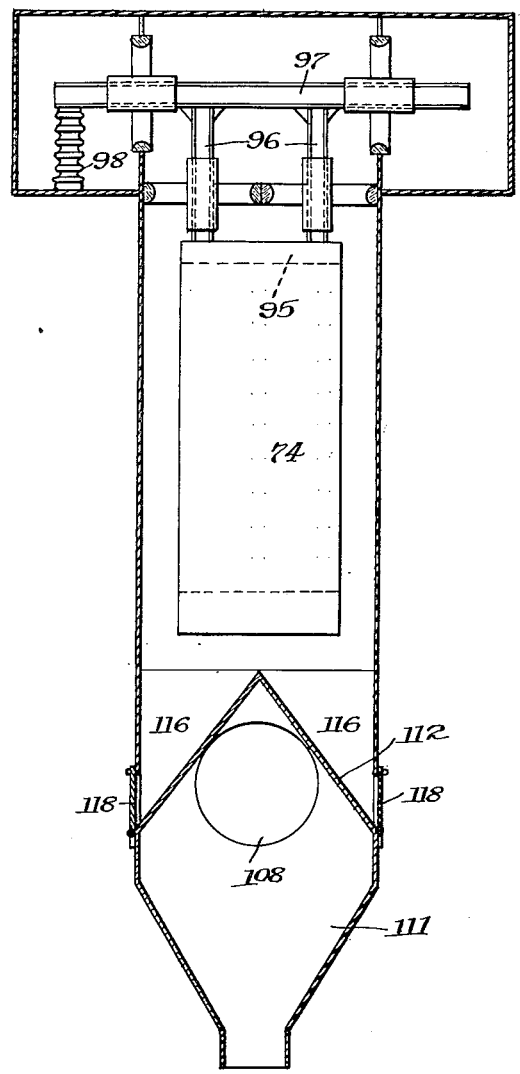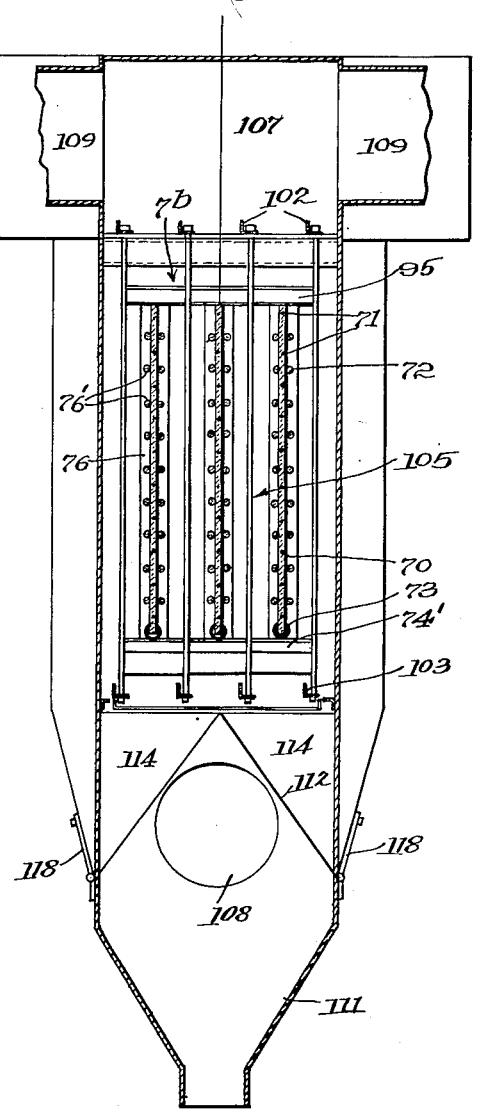

Patented May 8, 1934

1,957,458

UNITED STATES PATENT OFFICE 1,957,458

APPARATUS FOR ELECTRICAL PRECIPITATION OF SUSPENDED PARTICLES FROM GASES

George H. Horne, Glendale, and Marcel A. Lissman, Temple City, Calif., assignors to International Precipitation Company, Los Angeles, Calif., a corporation of California Application April 11, 1932, Serial No. 604,508
Renewed August 1, 1933

4 Claims. (Cl. 183—7)

This invention relates to apparatus for electrical precipitation of suspended particles from gases and particularly to electrical precipitation apparatus of the general type in which there are provided, in addition to one or more receiving electrodes of extended area, one or more ionization electrode units disposed in spaced relation with respect to said receiving electrodes and each comprising two sets of ionization electrode elements suitably spaced from one another, and in which separate electric potentials are applied between the respective sets of ionization electrode elements and between the ionization electrode units and the receiving electrodes.

The principal object of this invention is to provide a novel and advantageous construction of an electrical precipitator of the above general type.

A particular object of this invention is to provide an electrical precipitator construction of this type in which the electrode elements of one set of ionization electrodes consists of bare metallic conducting members directly exposed to contact with the gas stream while those of the other set consist of metallic conducting members separated from the first-mentioned set by coatings or protecting layers of insulating or high resistance material, formed for example as tubes, plates or other bodies of glass, fused quartz, mica, or the like, and in which advantageous means are provided for supporting the two sets of ionization electrode elements and for insulating the same from one another and from the receiving electrodes.

A further object of the invention is to provide a construction in which the two sets of ionization electrode elements are mounted on a common supporting frame structure which is in turn insulated with respect to the receiving electrodes, together with means whereby the individual conducting members constituting one set of ionization electrodes may be electrically connected, within the precipitator housing, to a single lead-in conductor, and means for preserving the electrical insulation of said individual conducting members from the other set of ionization electrode elements.

The receiving electrodes of the apparatus of our invention may be of any suitable type such as are commonly used in electrical precipitation apparatus, and the present invention is directed particularly to the construction, insulation and mounting of the two sets of ionization electrodes. The invention may, however, also be considered as comprising a complete electrical precipitation apparatus including ionization electrode units of improved type together with suitable receiving electrode means.

According to our invention, the ionization electrode system may comprise an ionization electrode supporting structure mounted on insulating supports, one or more ionization electrode units each comprising two sets of ionization electrode elements mounted on said supporting structure and spaced from one another, the electrode elements of one set consisting of bare metallic conductors and the electrode elements of the other set consisting of metallic conductors separated from the first set by coatings or protecting layers of insulating or high resistance material, a lead-in conductor for the bare metallic electrode elements directly connected to said supporting structure and hence to said bare electrodes, a separate lead-in conductor connected to the individual conducting members of the other set of ionization electrode elements, insulation means surrounding said last-mentioned lead-in conductor, and casing means mounted on said supporting structure and inclosing the connections of said last-mentioned lead-in conductor to said individual conducting members and preferably also inclosing the adjacent portions of the insulation means surrounding said lead-in conductor and of the insulating material covering the individual conducting members so as to prevent deposition of conducting deposits on said insulation means and covering.

The accompanying drawings illustrate apparatus embodying our invention and referring thereto:

Fig. 1 is a longitudinal vertical section of one form of such apparatus.

Fig. 2 is a horizontal section on line 2—2 in Fig. 1.

Fig. 3 is a transverse section on line 3—3 in Fig. 2.

Figs. 4 and 5 are detail sectional views on lines 4—4 and 5—5 respectively, in Fig. 3.

Fig. 6 is a longitudinal vertical section of a modified form of apparatus.

Fig. 7 is a partial horizontal section thereof on line 7—7 in Fig. 6.

Fig. 8 is a transverse section on line 8—8 in Fig. 6.

Fig. 9 is a longitudinal vertical section of another modification of the invention.

Fig. 10 is a horizontal section on line 10—10 in Fig. 9.

Figs. 11, 12 and 13 are transverse sections on lines 11—11, 12—12, and 13—13 respectively, in Fig. 10.

Fig. 14 is an enlarged vertical section on line 14—14 in Fig. 9.

In Figs. 1 to 5 inclusive, the ionization electrode units 1 are shown as each comprising a set of bare metallic electrode elements 2 and a set of insulation covered electrode elements 3, both of said sets of elements extending vertically and being alternately and closely spaced with respect to one another and extending in vertical planes, so that each discharge electrode unit comprises a vertical curtain-like structure formed by said electrode elements and extending longitudinally with respect to the direction of gas flow, within the precipitator housing or shell 4 provided with inlet and outlet flue connections 5 and 6. Any suitable number of such ionization electrode units may be provided, suitably spaced from one another transversely of the precipitator housing, and receiving electrodes 7, also extending vertically and longitudinally within the housing, are alternately disposed between the respective ionization electrode units.

The bare ionization electrode elements 2 are shown as comprising small diameter rods or pipes supported at their upper ends on supporting members such as angle bars 8, for example, by means of pins 9 extending therethrough and resting on washers 11 supported on said angle bars. The insulation covered ionization electrode elements 3 are shown as comprising metal wires or fine rods, each extending within and surrounded by a tube 13 of insulating or high resistance material such as glass, fused quartz, mica or the like. Said last-named elements may also be supported on the supporting members 8, for example, by means of enlargements 15 on tubes 13. The lower ends of the ionization electrode elements 2 and 3 are preferably kept in properly spaced and aligned position by means of horizontal spacing strips or members 16 through which said electrode elements loosely extend, and transverse spacing strips or members 17 are also preferably provided, the spacing members 16 and 17 being supported, for example, upon the lower end portions of certain of the bare electrode elements such as the element 2a in Fig. 5, for example, by means of supporting sleeves or bushings 18 secured to said electrode elements and engaging beneath said spacing members.

The electrode elements 3 with their respective insulating coverings 13 extend up above the supporting members 8 and have their upper portions inclosed within and protecting housing 21 comprising bottom plate 22, top plate 23, end plates 24 and side plates 25. The bare electrode members 2 and the insulating tubes 13 extend through the bottom plate 22 and a close fit, preferably substantially gas tight, is provided at this point. Said housing is carried by supporting bars 26 and serves also to support the members 8 together with the electrode elements carried thereby. The supporting members 26 extend through openings 27 and partitions 28 and rest at their ends on insulating supports 29.

A lead-in conductor 31 is electrically connected within the precipitator housing to the bare ionization electrode elements 2, for example, by connection to the metallic supporting members 26 and thence through the walls of housing 21 and the supporting members 8 to said electrode elements. Said lead-in conductor extends out through a suitable insulating bushing 32 on the precipitator housing. A second lead-in conductor 33 extends within an insulating sleeve 34 and through the top plate 23 of housing 21. A plug 34' or other packing means provides a tight fit where said sleeve passes through said top plate. The ionization electrode elements 3 project beyond the upper ends of the insulating tubes 13 and are connected by wires 35 to said lead-in conductor 33. Said lead-in conductor extends out through an insulating bushing 36 mounted on the pericipitator housing.

The collecting electrodes 7 are shown as comprising vertical plates of vertically corrugated metal secured at their upper ends to supporting members 38 which rest at their ends on supporting beams 39. The lower ends of the corrugated collecting electrode plates are connected to stiffening members 41 whose ends extending between spacing lugs 42 on members 43 extending transversely across the precipitator housing, so as to preserve the proper spacing of the collecting electrodes from the ionization electrode units while permitting vertical movement of the lower ends of the collecting electrodes in case of expansion or contraction thereof.

The electric circuit is shown diagrammatically in Fig. 3, comprising a transformer 45 whose secondary winding is connected by wires 46 and 47 respectively, to the lead-in conductors 31 and 33 and is adapted to deliver alternating current at suitable potential for maintaining ionization between the bare and covered electrode elements 2 and 3. Said circuit further comprises a transformer 48 whose secondary winding is connected by wires 49 to a mechanical rectifier 51 or other suitable rectifying means. One output terminal of said rectifying means is connected by wire 52 to the wire 46 aforesaid and thence to the lead-in conductor 31 while the other output terminal thereof is connected by wire 53 to the receiving electrode system and is also preferably grounded as indicated at 54. The transformer 48 and rectifying means 51 are adapted to deliver unidirectional current at sufficient voltage to maintain an effective precipitating field between the ionization electrode elements 2 and the receiving electrodes 7.

The insulating tubes 13 extend upwardly within the protecting housing 21 for a sufficient distance to prevent leakage of electric current along the surfaces thereof from the electrode wires 3 or the connecting wires 35 to the metallic supporting members 8 and the lower wall 22 of said housing. Similarly, the insulating sleeve 34 extends to a sufficient distance below the upper wall 23 of said housing to prevent leakage of electric current from lead-in conductor 34 for connecting wires 35 to said upper wall.

In the operation of the above described apparatus, the gas to be treated and containing suspended solid or liquid particles is passed through the precipitator housing and along the passages provided between the ionization electrode units 1 and the receiving electrodes 7. The ions produced by the electric discharge between elements 2 and 3 cause the suspended particles to become electrically charged, and the unidirectional electric field between the ionization electrode units and the receiving electrodes facilitates the distribution of the ions out into the gas and also cause the charged suspended particles to be driven toward and be precipitated upon, the receiving electrodes, whence the material falls to the bottom of the precipitator housing and into the collecting hopper 54.

Some of the suspended material is also inevitably deposited upon the ionization electrode units but does not interfere with the operation thereof. The protecting housing 21, however, performs an important function in that it prevents access of the dirty gas to the portions of the insulating tubes 13 and 34 adjacent the point where the metallic conductors therein are brought out and connected to wires 35, and thus prevents deposition of any conducting solid or liquid material on these portions of said insulating tubes so that the necessary resistance to leakage of electric current at these points is maintained.

The form of the invention shown in Figs. 6 to 8 inclusive, is similar to that above described with the exception of the construction of the ionization electrode units 1a. In this case each of such units is shown as comprising a vertically disposed plate 56 of insulating or dielectric material such as glass, fused quartz or mica, having vertically extending wires or other electrode elements 57 embedded therein at suitable intervals. The plates 56 rest at their lower ends upon supporting channels 58. Transverse frame members 59 are connected at the ends of the frame members 58, and the frame members 58 and 59 are carried by supporting bars or rods 61 extending upwardly at the ends of the plates 56 and connected at their upper ends to bars 62 within the protecting housing 21a.

The bare ionization electrode elements are shown in this case as comprising rods 64 extending vertically alongside the plate 56 at both sides thereof and midway between each pair of adjacent embedded elements 57. The lower ends of rods 64 extend through the frame members 58, while the upper ends thereof are supported on the bottom plate of the protecting housing 21a as by means of projecting heads or enlargements 65. The insulation covered electrode elements 57 project from the insulating plates at their upper ends and are connected as before by wires 35a to lead-in conductor 33a. Also, the plates 56 extend upwardly within the housing 21a for a sufficient distance to prevent leakage across the surfaces thereof from the members 57 or 35a to the walls of said housing. Lead-in conductor 31a is also connected, as before, to the insulated supporting structure on which the ionization electrode units are mounted, and is thus electrically connected to the bare electrode elements 64.

The construction and mounting of the protecting housing 21a within the precipitator housing may be substantially the same as in the form of the invention first described and similar means may also be provided for maintaining the necessary electric potentials between the two sets of ionization electrodes and between the ionization electrode units and the collecting electrodes. Also, the construction and mounting of the collecting electrodes 7a may be substantially the same as the electrodes 7 above described.

In the form of the invention shown in Figs. 9 to 14 inclusive, the ionization electrode elements extend horizontally and the protecting housing 21b for preventing access of conducting material contained in the gas to the surfaces of the insulating material covering the end portions of the insulation covered ionization electrode elements and the insulating material covering the lead-in conductor connected thereto is shown as extending vertically alongside one end of the ionization electrode units.

Each ionization electrode unit 1b is shown as comprising a vertically disposed plate 70 of glass, quartz, or other insulating material, a set of horizontally extending ionization electrode elements 71 embedded within said plate and a set of bare ionization electrode elements 72 consisting of metal rods or the like extending horizontally along each side of plate 70 midway between the elements 71. The insulating plates 70 rest at their lower edges on bottom supporting members 73 which are supported at one end on a transverse baffle plate 74 and at the other end on a plate 75 which forms one side wall of the protecting housing 21b. Supporting members 73 may rest upon and be secured to bars 74' and 75' on plates 74 and 75 respectively, so as to provide a rigid supporting structure. The bare electrode elements 72 are also supported at their ends on plates 74 and 75 and are shown as so supported by resting in notches 76' in bars 76 secured to said plates. The electrode elements 72 serve to support the insulating plate 70 laterally and preserve the proper spacing therebetween. The insulating plate 70 projects beyond plate 75 into the interior of the protecting housing 21b and the projecting portion 78 of said plate is provided with a common conductor 79 embedded therein and connected to the ends of all of the embedded electrode elements 71.

The protecting housing 21b comprises, in addition to the plate 75 aforesaid, another side plate 81, end plates 82, top plate 83 and bottom plate 84. The bottom plate 84 of said housing rests upon supporting channel 85 which is carried at its ends by vertical channels 86 connected at their upper ends to channel 87 which is hung by bars 88 from a main supporting member 89 carried on insulating supports 91.

Baffle 74 is preferably provided with a stiffening member 95 at the upper end, and said baffle plate and stiffening member are hung by bars 96 from a supporting bar 97 mounted at its ends on insulating supports 98.

Lead-in conductor 31b is connected as before to the supporting structure of the ionization electrode system, being connected for example to supporting bar 89, while lead-in conductor 33b is connected to the conductor 79 and thence to the embedded ionization electrode members 71, said lead-in conductor 33b extending within insulating sleeve 99, through the wall 81 of housing 21b and through the adjacent end wall of the precipitator housing.

The collecting electrodes 7b shown in this embodiment of the invention are of the rod-curtain type, each of said collecting electrodes comprising a plurality of closely spaced vertical rods or pipes 101 of small diameter supported at their upper ends on bar 102 suitably supported within the precipitator housing, and extending at their lower ends through suitably supported spacing bars 103. The series of rods 101 of each collecting electrode are disposed in a substantially vertical plane midway between the respective ionization electrode units.

The ionization electrode units and collecting electrodes are shown as extending across a precipitator chamber 105, and inlet chamber 106 and outlet 107 are provided below and above said precipitator chamber. The gas may be introduced into inlet chamber 106 in any suitable manner, for example, through inlet flues 108 communicating with the opposite ends of said inlet chamber, and may be discharged from outlet chamber 107 in any suitable manner, for example, through outlet flues 109 connected to opposite sides of said outlet chamber and preferably disposed at right angles to the position of the inlet flues 108. A collecting hopper 111 is provided beneath the inlet chamber 106. Deflecting partitions 112 and 113 extend inwardly from the opposite end walls of the precipitator housing directly above the points of entrance of the inlet flues 108, to vertical partitions 114 so as to cause the gas entering through inlet flues 108 to pass beneath the partitions 112 and 113 and upwardly between partitions 114 and through the precipitator chamber 105. The partitions 112 and 113 preferably slope downwardly and outwardly from the center of the precipitator to the opposite side walls thereof as shown in Figs. 13 and 11 respectively, so as to provide pockets 116 and 117 between said partitions and the side walls for receiving material settling upon said partitions, and removable closure members or doors 118 and 119 are preferably provided permitting access to said pockets for removal of collected material therefrom.

As in the other forms of the invention, the lead-in conductors 31b and 33b, connected respectively to the bare and insulation-covered ionization electrode elements 71 and 72, may be connected to the opposite terminals of a suitable source of alternating electric current at sufficient potential to maintain an ionizing discharge between said ionization electrode elements, while the collecting electrodes 7b and one of the sets of ionization electrode elements, such as the bare electrode elements 72 are connected to a suitable source of unidirectional electric current at sufficient voltage to maintain an electric field therebetween of sufficient intensity to cause precipitation of charged particles of suspended matter upon the collecting electrodes. The electric circuit may, for example, be substantially the same as shown in Fig. 3.

The operation of this form of the invention is substantially the same as those above described.

We claim:—

1. In an electrical precipitation apparatus, an ionization electrode unit comprising two sets of ionization electrode elements spaced from one another, one set consisting of metallic conductors separated from the first set by coatings of insulating material, a lead-in conductor electrically connected to said metallic conductors of the first set, a separate lead-in conductor connected to the individual metallic conductors of the other set and provided with insulation means, and casing means inclosing the connection of said last-named lead-in conductor to said metallic conductors of said other set.

2. An electrical precipitation apparatus comprising an ionization electrode unit comprising two sets of spaced ionization electrode elements, one set consisting of bare metallic conductors exposed to the surrounding gas and the other set consisting of metallic conductors separated from the first set by insulating material, a lead-in conductor electrically connected to said metallic conductors of the first set, a separate lead-in conductor connected to the individual metallic conductors of the other set, casing means inclosing the connection of said last-named lead-in conductor to said metallic conductors of said other set, means insulating said casing means from said last-named lead-in conductor and the metallic conductor connected thereto, a collecting electrode opposing and spaced from said ionization electrode unit, a source of relatively low potential electric current connected between said lead-in conductors, and means for maintaining a relatively high potential electric field between said ionization electrode unit and said collecting electrode.

3. An electrical precipitation apparatus comprising a precipitator housing, an ionization electrode supporting structure mounted within said housing and insulated therefrom, an ionization electrode unit comprising two sets of ionization electrode elements mounted on said supporting structure and spaced from one another, the electrode elements of one set consisting of bare metallic conductors electrically connected to said insulated supporting structure, and the electrode elements of the other set consisting of metallic conductors provided with insulating material separating the same from the first set, a lead-in conductor electrically connected to said metallic conductors of the first set, a separate lead-in conductor connected to the individual metallic conductors of the other set, casing means mounted on said supporting structure inclosing the connection of said last-named lead-in conductor to the individual metallic conductors of said other set, and insulating material separating said last-named lead-in conductor from said casing means.

4. An electrical precipitation apparatus comprising a precipitator housing, an ionization electrode supporting structure mounted within said housing and insulated therefrom, a plurality of ionization electrode units mounted on said supporting structure and each comprising two spaced sets of metallic electrode elements, insulating material separating the elements of one set from the elements of the other set, a lead-in conductor electrically connected to said electrode elements of one set, a separate lead-in conductor connected to said electrode elements of the other set, casing means mounted on said supporting structure and inclosing the connection of said last mentioned lead-in conductor to said electrode elements of said other set, means insulating said electrode elements of said other set from said insulating supporting structure and said casing means, a plurality of collecting electrodes opposing and spaced from said ionization electrode units, a source of relatively low potential electric current connected between said lead-in conductors, and means for maintaining a relatively high potential electric field between said ionization electrode units and said collecting electrodes.

GEORGE H. HORNE.
MARCEL A. LISSMAN.